United States Patent
Peck, Jr. et al.

(10) Patent No.: US 6,945,579 B2
(45) Date of Patent: Sep. 20, 2005

(54) GLOVE BOX DOOR ASSEMBLY

(75) Inventors: John F. Peck, Jr., Canton, MI (US);
David E. Righter, Troy, MI (US);
Aaron M. Delong, Orion, MI (US);
Sarkis B. Mikhjian, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/607,614

(22) Filed: Jun. 27, 2003

(65) Prior Publication Data

US 2004/0262937 A1 Dec. 30, 2004

(51) Int. Cl.⁷ ................................................ B60R 7/06
(52) U.S. Cl. ................................ 296/37.12; 296/37.8
(58) Field of Search .......................... 296/37.8, 37.12; 224/483

(56) References Cited

U.S. PATENT DOCUMENTS

| | | | |
|---|---|---|---|
| 4,239,277 A | 12/1980 | Oda | |
| 4,460,105 A | 7/1984 | Cox | |
| 4,786,098 A | 11/1988 | Jobmann et al. | |
| 4,886,311 A | 12/1989 | Trube et al. | |
| 5,190,314 A | 3/1993 | Takasugi | |
| 5,275,456 A | 1/1994 | Ishii et al. | |
| 5,516,177 A | 5/1996 | Levely | |
| 5,845,954 A | 12/1998 | DePue | |
| 5,868,448 A | 2/1999 | Izumo | |
| 5,887,930 A | 3/1999 | Klein | |
| 5,904,389 A | 5/1999 | Vaishnav et al. | |
| 5,951,083 A * | 9/1999 | Bittinger et al. | 296/37.12 |
| 5,971,461 A | 10/1999 | Vaishnav et al. | |
| 5,971,463 A | 10/1999 | Nowak et al. | |
| 6,076,878 A | 6/2000 | Isano | |
| 6,131,242 A * | 10/2000 | Zipperle et al. | 296/37.8 |
| 6,189,662 B1 | 2/2001 | Bivens et al. | |
| 6,582,002 B2 * | 6/2003 | Hogan et al. | 296/37.12 |
| 2004/0051334 A1 * | 3/2004 | Park | 296/37.12 |
| 2004/0066053 A1 * | 4/2004 | Fero | 296/37.8 |

* cited by examiner

*Primary Examiner*—Lori L. Coletta
(74) *Attorney, Agent, or Firm*—MacMillan, Sobanski & Todd, LLC

(57) ABSTRACT

A glove box door assembly for a glove box provided in an opening of an instrument panel of a vehicle defining an engagement surface includes a door body rotatably attached to an instrument panel of a vehicle about an axis of rotation. The door body has an inner surface and an outer surface. A bin extends outwardly from the inner surface of the door body, and includes an outer wall. A damper extends outwardly from the outer wall of the bin, and includes a damper surface. The glove box door assembly is movable between a closed position and an open position. The damper surface is disposed at an acute angle relative to a plane substantially perpendicular to the axis of rotation, and engages an engagement surface of an opening of the instrument panel to decelerate the glove box door assembly when the glove box door assembly moves from the closed position to the open position.

17 Claims, 4 Drawing Sheets

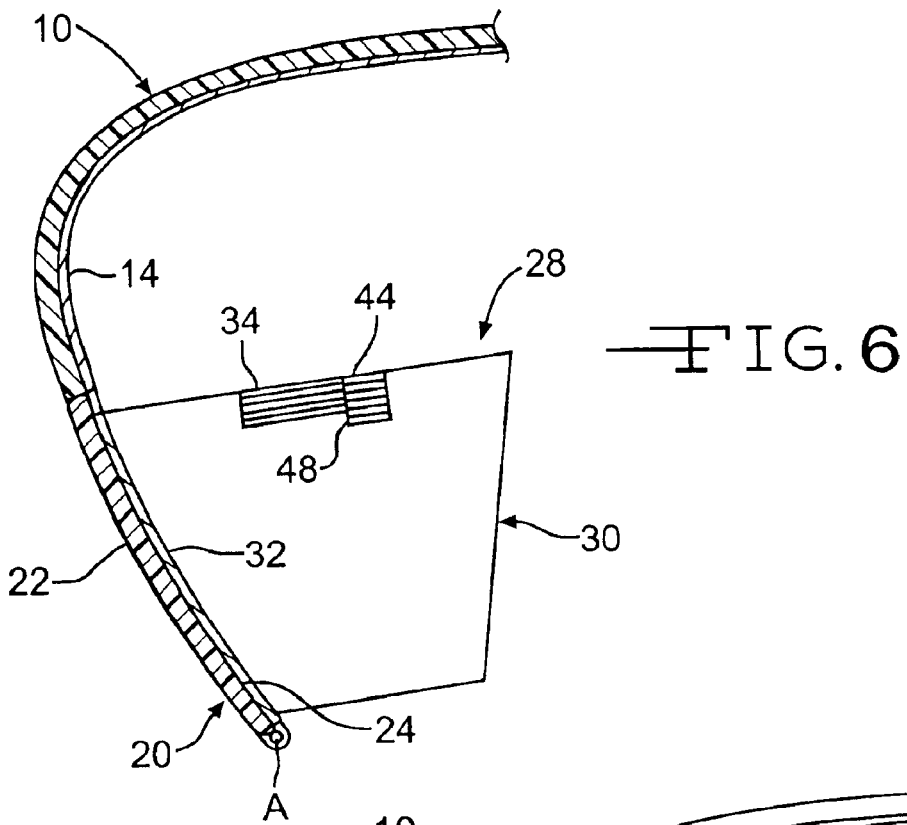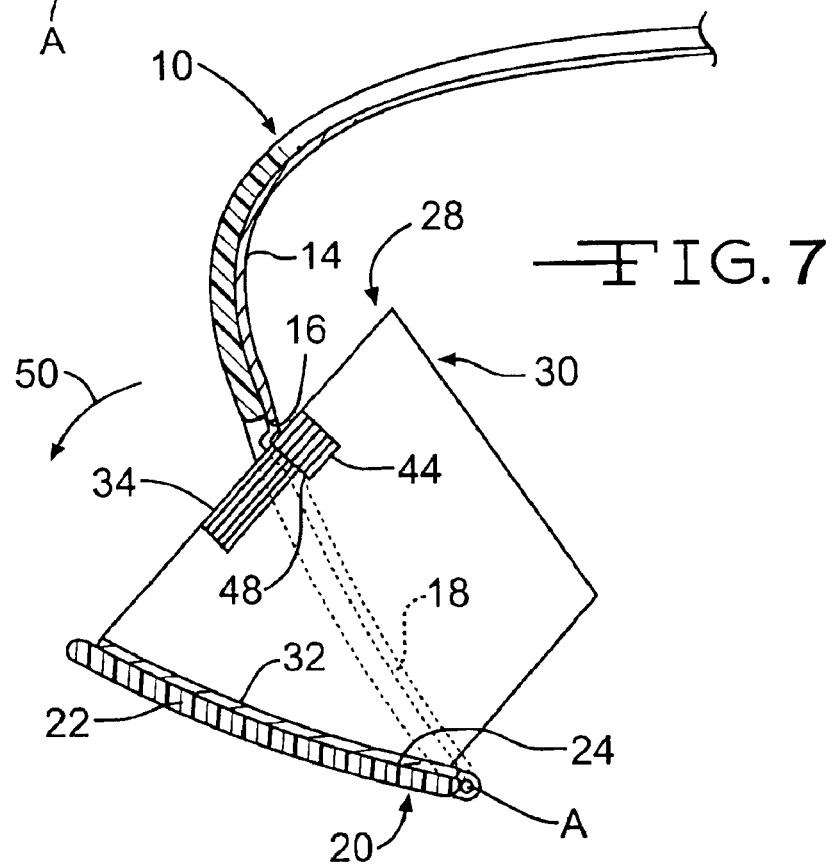

GLOVE BOX DOOR ASSEMBLY

TECHNICAL FIELD

This invention relates to a glove box door assembly for a vehicle. More particularly, the invention relates a glove box door assembly having improved damper and stop.

BACKGROUND OF THE INVENTION

It is often desirable to improve the strength and rigidity of a vehicle glove box door by adding a rigid reinforcement component, such as a steel plate. However, such a reinforcement component may increase the weight of the glove box door. Such increased weight may cause the glove box door to open at a speed which is undesirable to a vehicle occupant. It would therefore be advantageous if there could be developed an improved glove box door assembly which enhances the satisfaction of the vehicle occupant.

SUMMARY OF THE INVENTION

This invention relates to an improved glove box door assembly for a glove box provided in an opening of an instrument panel of a vehicle defining an engagement surface. The glove box door assembly includes a door body rotatably attached to an instrument panel of a vehicle about an axis of rotation. The door body has an inner surface and an outer surface. A bin extends outwardly from the inner surface of the door body, and includes an outer wall. A damper extends outwardly from the outer wall of the bin, and includes a damper surface. The glove box door assembly is movable between a closed position and an open position. The damper surface is disposed at an acute angle relative to a plane substantially perpendicular to the axis of rotation, and engages an engagement surface of an opening of the instrument panel to decelerate the glove box door assembly when the glove box door assembly moves from the closed position to the open position.

Various objects and advantages of this invention will become apparent to those skilled in the art from the following detailed description of the preferred embodiments, when read in light of the accompanying drawings.

BRIEF DESCRIPTION OF THE DRAWINGS

FIG. 6 is a cross-sectional view taken along line 6—6 of FIG. 1, showing the glove box door assembly in the closed position.

FIG. 7 is a cross-sectional view of the glove box door assembly illustrated in FIG. 6, showing the glove box door assembly in the fully open position.

DETAILED DESCRIPTION OF THE INVENTION

Figure 1:
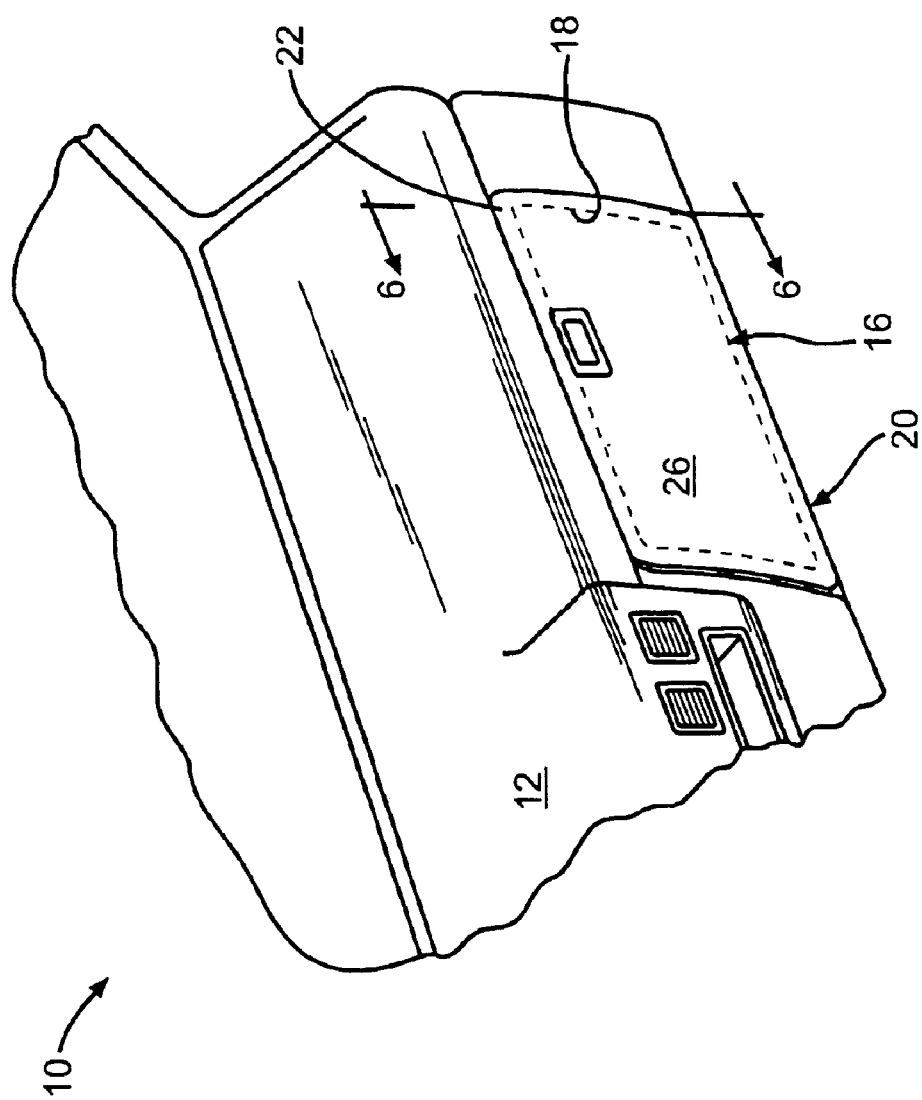
FIG. 1 is a partial perspective view of an instrument panel having a glove box door assembly according to the invention.

Referring now to the drawings, there is illustrated in FIG. 1 an instrument panel, indicated generally at 10. The instrument panel 10 is an example of a trim panel for mounting in an interior cabin of a vehicle. It will be appreciated however, that the trim panel 10 of the subject invention may be any type of trim panel associated with a vehicle. Other suitable examples of trim panels include door panels, center consoles, overhead consoles, and other various interior panels for covering the sides, ceilings, and/or vertical pillars of the frame members of the vehicle.

The instrument panel 10 is installed on a vehicle frame generally in the area underneath the windshield and between the engine compartment and the interior of the vehicle. The instrument panel 10 can include any suitable frame structure (not shown) for supporting the instrument panel 10 to the vehicle frame. The portion of the exemplary instrument panel 10 illustrated in FIG. 1 includes a show or front surface 12, an inner surface 14 (as best shown in FIGS. 6 and 7), and a glove box opening 16 in the instrument panel 10. The glove box opening 16 defines an engagement surface 18. A glove box door assembly 20 is provided for closing the glove box opening 16.

Figure 2:
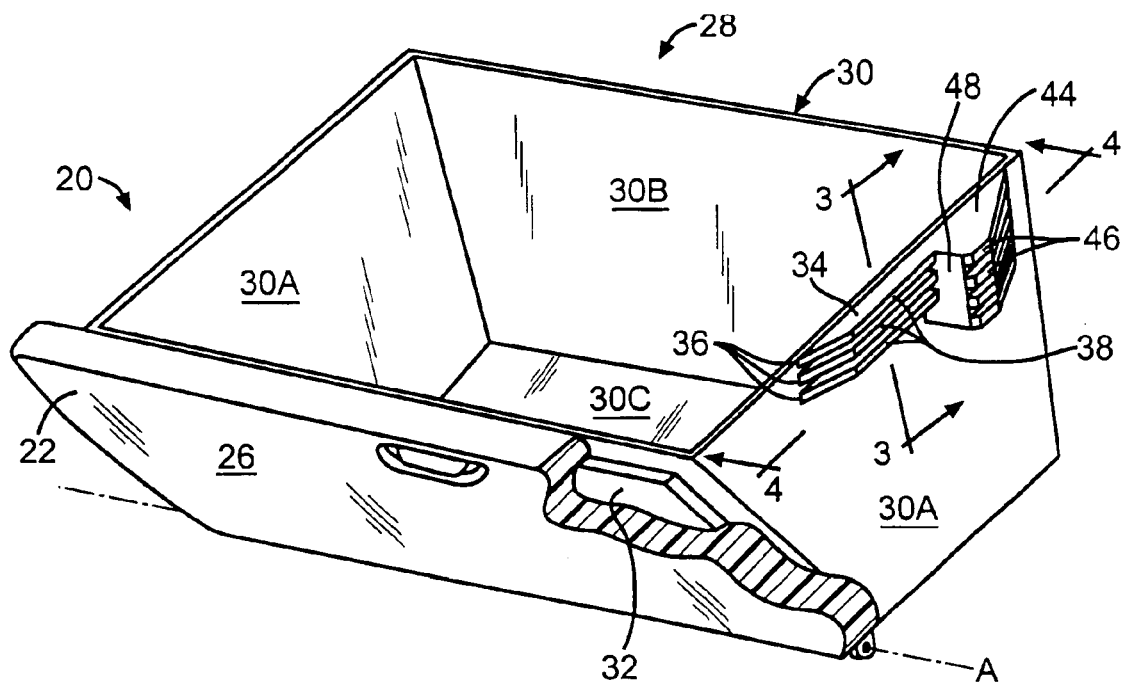
FIG. 2 is a perspective view of the glove box door assembly illustrated in FIG. 1.
Figure 3:
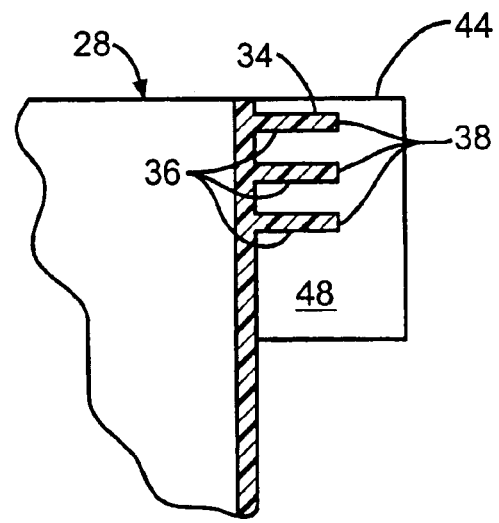
FIG. 3 is a cross-sectional view taken along line 3—3 of FIG. 2, showing the damper.

As best shown in FIG. 2, the glove box door assembly 20 includes a door body 22. Preferably, the door body 22 is rotatably attached to a portion of the instrument panel 10 about an axis of rotation A. The door body 22 includes an inner surface 24 and an outer surface 26.

A bin 28 extends outwardly from the inner surface 24 of the door body 22. The bin 28 includes an outer wall 30. The bin 28 can be attached to the door body 22 by any desired means, such as by vibration welding or with threaded fasteners. In the exemplary embodiment illustrated in FIG. 2, the bin 28 includes outer side walls 30A, an outer rear wall 30B, and a bottom wall 30C. However, it will be understood that the bin 28 can include an outer wall having any desired shape or combination of shapes, such as curved or arcuate walls. Preferably, the bin 28 is made of a relatively rigid material. More preferably, the bin 28 is made of a polymer or plastic material. Most preferably, the bin 28 is formed of a molded plastic material, such as polypropylene. However, it will be appreciated that the bin 28 can be formed of any other desired material.

The glove box door assembly 20 further includes a reinforcement panel 32 disposed between the door body 22 and the bin 28, as shown in FIGS. 6 and 7. Preferably, the reinforcement panel 32 is formed of a substantially rigid material such as steel, however steel is not required. The reinforcement panel 32 can also be formed from any other desired substantially rigid material. Although the door body 22, the bin 28, and the reinforcement panel 32 are shown in the exemplary embodiment at separate components, it will be understood that the door body 22, the bin 28, and the reinforcement panel 32 can be integrally formed as a glove box door assembly. A damper 34 extends outwardly from the outer wall of the bin 28. In tk e exemplary embodiment illustrated in FIGS. 2 through 5, inclusive, the damper 34 includes a plurality of substantially parallel, deceleration ribs 36. Each deceleration rib 36 includei an outwardly facing edge surface 38. Preferably, at least a portion 40 of the edge surface 38 surface is disposed at an acute angle a relative to a plane p, which is substantially perpendicular to the axis of rotation A. The edge surfaces 38 define a tapered damper surface 42, the function of which is described herein.

In the exemplary embodiment illustrated in the figures, the damper 34 includes three deceleration ribs 36. However, it will be understood that the damper 34 can include any desired number of deceleration ribs. Additionally, the damper 34 can include deceleration ribs 36 having edge surfaces 38 disposed at any desired acute angle a relative to the plane p. Preferably, the damper 34 is integrally formed with thu outer wall 30 of the bin 28.

As shown in FIGS. 2 through 5, inclusive, a stop 44 extends outwardly from the outer wall 30 of the bin 28. In the exemplary embodiment illustrated, the stop 44 includes a plurality of substantially parallel stop ribs 46. A stop surface 48 is disposed along a generally forward facing edge of the stop ribs 46. Preferably, the stop surface 48 is disposed substantially perpendicular to the outer wall 30 of the bin 28. As explained herein, the stop surface 48 engages the inner surface 14 of the instrument panel 10 when the glove box door assembly 20 is in the open position. Preferably, the stop 44 is integrally formed with the outer wall 30 of the bin 28.

In the exemplary embodiment illustrated in the figures, the stop 44 includes four stop ribs 46. However, it will be understood that the stop 44 can include any desired number of stop ribs. If desired, the stop surface 48 can be formed of a substantially resilient material, such as rubber. Alternately, a layer of resilient material (not shown) can be attached to the stop surface 48.

In operation, the glove box door assembly 20 is movable between a closed position, as shown in FIG. 6, and an open position, as shown in FIG. 7. When a latch or lock assembly (not shown) of the glove box door assembly 20 is released to expose the glove box bin 28, the force of gravity will cause the glove box door assembly 20 to rotate forwardly and downwardly about the axis of rotation A (e.g. in the direction of the arrow 50). As the glove box door assembly 20 begins the forward and downward movement, the damper surface 42 engages the engagement surface 18 of the opening 16 of the instrument panel 10.

Figure 4:
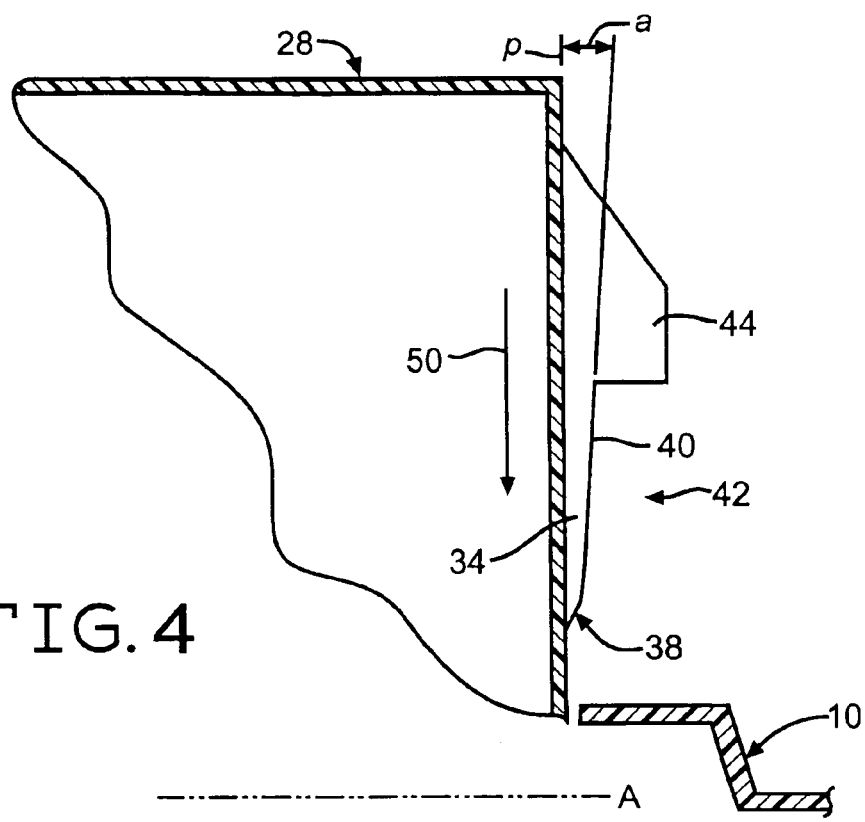
FIG. 4 is a partial plan view of the glove box door assembly illustrated in FIGS. 1 and 2, showing the door assembly intermediate the closed position and the fully open position.
Figure 5:
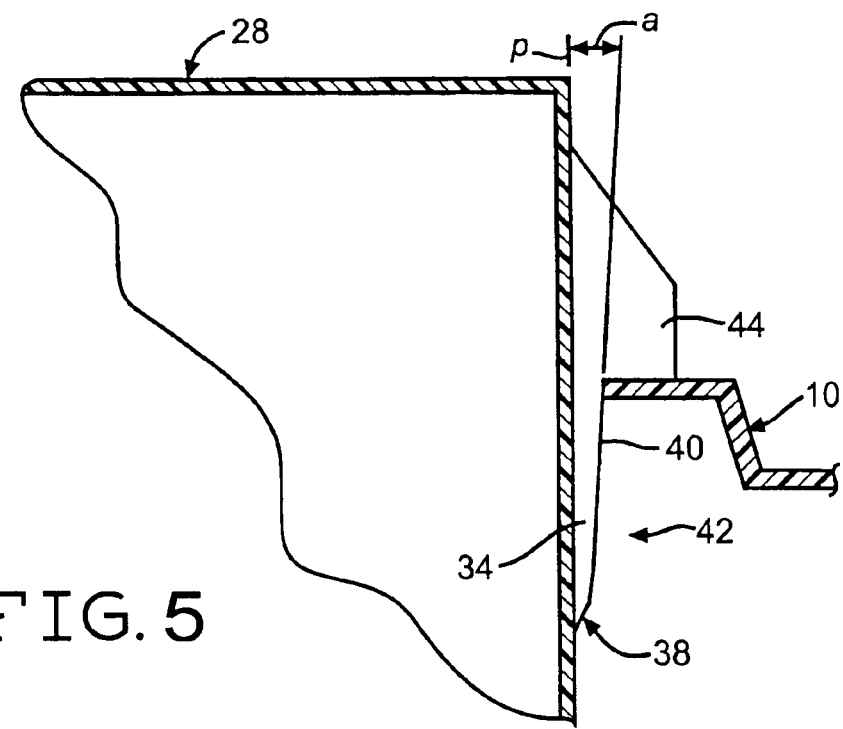
FIG. 5 is a partial plan view of the glove box door assembly illustrated in FIGS. 1 and 2, showing the door assembly in the fully open position.

The damper surface 42 continues to slide along the engagement surface 18 to decelerate the glove box door assembly 20 as the door assembly 20 moves from a closed position to an open position. Preferably, the damper surface 42 slides along the engagement surface 18 from the closed position, as best shown in FIGS. 4 and 6, to a fully open position, as best shown in FIGS. 5 and 7. It will be understood that as used herein, "fully opened" is defined as the position wherein the stop surface 48 is in contact with the inner surface 14 of the instrument panel 10, as shown in FIGS. 5 and 7.

As the damper surface 42 slides along the engagement surface 18, the contact between the surfaces 42 and 18 is such that the glove box door assembly decelerates from the closed position to the fully open position without stopping. It will be understood that as used herein, deceleration is defined as the reduction of the speed of an object, slowing down, or moving at decreasing speed.

To accomplish such sliding movement, the engagement surface 18 can flex or slightly deform, so as to prevent the damper surface 42 from stopping due to friction intermediate the open and closed positions.

Alternately, the damper surface 42 can flex or slightly deform when the door assembly moves from the closed position to the open position. If desired, both the engagement surface 18 and the damper surface 42 can flex or slightly deform when the door assembly moves from the closed position to the open position.

Preferably, the tapered damper surface 42 frictionally engages the engagement surface 18 to gradually decelerate the glove box door assembly 20 when the door assembly 20 moves from the closed position to the open position. Although the engagement surface 18 is shown in the exemplary embodiment as an edge of the opening 16 of the instrument panel 10, it will be understood that the engagement surface 18 can be any desired surface, such as an elastomeric member, a spring, or a roller for engaging the damper surface 42.

The principle and mode of operation of this invention have been described in its preferred embodiment. However, it should be noted that this invention may be practiced otherwise than as specifically illustrated and described without departing from its scope.

What is claimed is:

1. A glove box door assembly for a glove box provided in an opening of an instrument panel of a vehicle defining an engagement surface, the glove box door assembly comprising:
    a door body rotatably attached to the instrument panel of a vehicle about an axis of rotation, the door body having an inner surface and an outer surface;
    a bin extending outwardly from the inner surface of the door body, the bin having an outer wall; and
    a damper extending outwardly from the outer wall of the bin, the damper including a damper surface;
    wherein the glove box door assembly is movable between a closed position and an open position;
    wherein the damper surface is disposed at an acute angle relative to a plane substantially perpendicular to the axis of rotation; and
    wherein the damper surface engages the engagement surface of an opening of the instrument panel to decelerate the glove box door assembly when the glove box door assembly moves from the closed position to the open position.

2. The glove box door assembly according to claim 1, wherein the engagement surface of the opening of the instrument panel flexes when the door assembly moves from the closed position to the open position.

3. The glove box door assembly according to claim 1, wherein the damper surface flexes when the door assembly moves from the closed position to the open position.

4. The glove box door assembly according to claim 1, wherein the damper surface frictionally engages the engagement surface of the opening of the instrument panel to decelerate the glove box door assembly when the door assembly moves from the closed position to the open position.

5. The glove box door assembly according to claim 1, further including a reinforcement panel disposed between the door body and the bin.

6. The glove box door assembly according to claim 1, further including a stop extending outwardly from the outer wall of the bin, the stop including a stop surface, such that in the open position, the engagement surface of the stop engages an inner surface of the instrument panel.

7. The glove box door assembly according to claim 6, wherein the stop is integrally formed with the outer wall of the bin.

8. The glove box door assembly according to claim 1, wherein the damper comprises a plurality of substantially parallel ribs.

9. A glove box door assembly for a glove box provided in an opening of an instrument panel of a vehicle defining an engagement surface, the glove box door assembly comprising:
    a door body rotatably attached to the instrument panel of a vehicle about an axis of rotation, the door body having an inner surface and an outer surface;

a bin extending outwardly from the inner surface of the door body, the bin having an outer wall; and a damper integrally formed with and extending outwardly from the outer wall of the bin, the damper including a damper surface;

wherein the glove box door assembly is movable between a closed position and an open position;

wherein the damper surface is disposed at an acute angle relative to a plane substantially perpendicular to the axis of rotation; and wherein the damper surface engages the engagement surface of an opening of the instrument panel when the door assembly is moved between the closed position and the open position.

10. The glove box door assembly according to claim 9, wherein the damper surface engages the engagement surface of the opening of the instrument panel to decelerate the glove box door assembly when the door assembly moves from the closed position to the open position.

11. The glove box door assembly according to claim 9, wherein the engagement surface of the opening of the instrument panel flexes when the door assembly moves from the closed position to the open position.

12. The glove box door assembly according to claim 9, wherein the damper surface flexes when the door assembly moves from the closed position to the open position.

13. The glove box door assembly according to claim 9, wherein the damper surface frictionally engages the engagement surface of the opening of the instrument panel to decelerate the glove box door assembly when the door assembly moves from the closed position to the open position.

14. The glove box door assembly according to claim 9, further including a reinforcement panel disposed between the door body and the bin.

15. The glove box door assembly according to claim 9, further including a stop extending outwardly from the outer wall of the bin, the stop including a stop surface, such that in the open position, the engagement surface of the stop engages an inner surface of the instrument panel.

16. The glove box door assembly according to claim 15, wherein the stop is integrally formed with the outer wall of the bin.

17. The glove box door assembly according to claim 9, wherein the damper comprises a plurality of substantially parallel ribs.

* * * * *